United States Patent Office

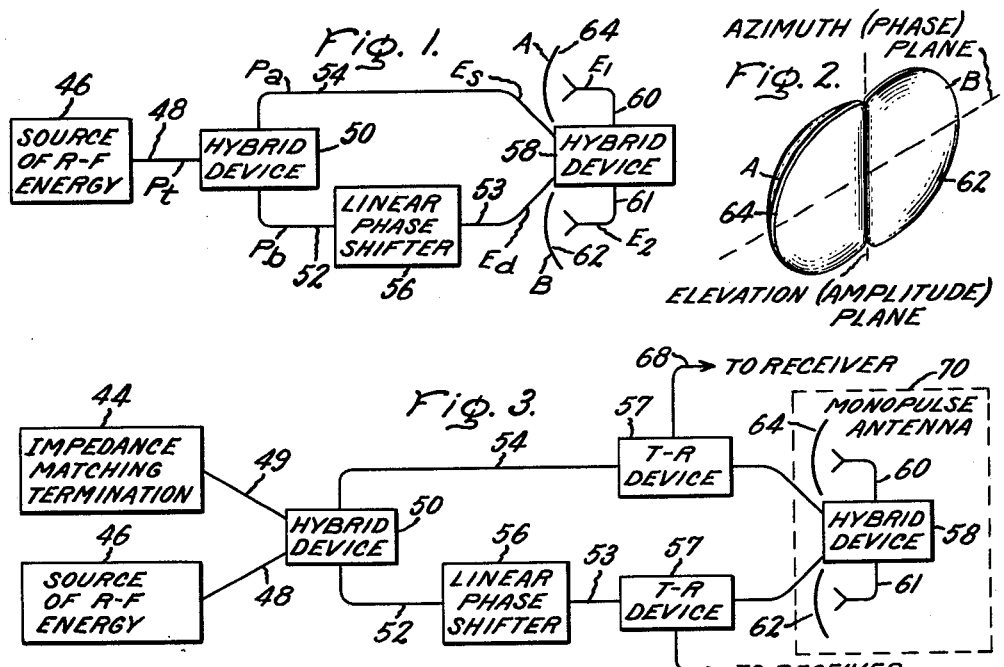
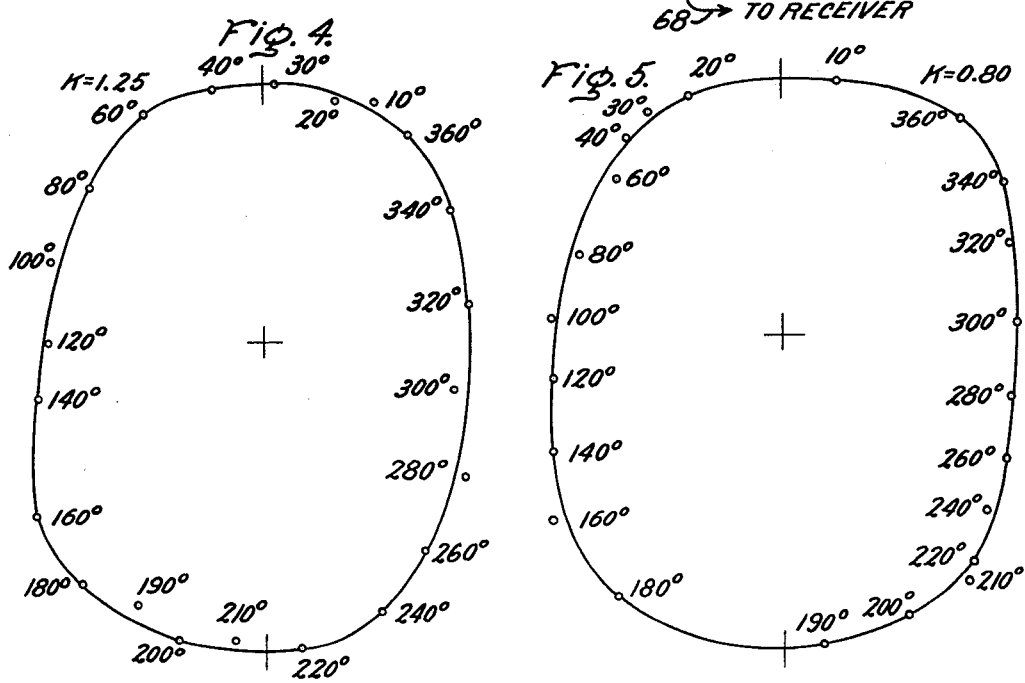

3,174,149
Patented Mar. 16, 1965

3,174,149
METHOD AND APPARATUS FOR PROPAGATION OF POSITIONAL ELECTROMAGNETIC WAVES
Oliver H. Winn, Whitesboro, N.Y., assignor to General Electric Company, a corporation of New York
Filed Dec. 30, 1958, Ser. No. 783,993
8 Claims. (Cl. 343—16)

This invention relates to electromagnetic radiation, and more particularly, to the utilization of two radio frequency (R-F) signals to produce a single electromagnetic beam which is positionable in space by varying the phase between the two signals.

It is frequently necessary to position electromagnetic energy in space. For example, it may be desirable to use radar to search a given volume of space electronically; or once an object (target) has been located in space, it may be necessary to track the object. A common way of electromagnetically tracking objects is by employing a conically scanning radar beam. Methods for causing electromagnetic energy to form a conical scan comprise (1) rotating and tilting the feed from which the energy emanates into space and (2) rotating and tilting the reflector directing the beam.

While the use of a conical scan provides accurate target information, there are certain disadvantages encountered in obtaining it in the ways listed hereinbefore. Mechanical movement of either the feed or the reflector requires more complex supports than does a stationary antenna. In addition antenna motion frequently results in electrical noise being introduced into the signal. Antennas with moveable parts generally require larger volumes of space. Also, it is extremely difficult, if not impossible, to mount a rotating reflector flush with the skin of the airplane. Thus, it is obvious that obtaining a conical scan with a stationary or non-spinning antenna would meet a definite need and would be very desirable.

In the present state of the art, two techniques are commonly used to track targets in active radar systems. These two techniques are conical scan and monopulse. One monopulse technique, which is a phase-amplitude comparison method, is described in co-pending application Serial No. 238,112, filed July 23, 1951, entitled "Radar Tracking Amplifying System" in the name of the same inventor and assigned to the same assignee, and provides complete angular tracking information from one bit of received information. This technique uses an antenna with no spinning parts, which in general means it is lighter in weight than the conical scan antenna and permits advantageous antenna installations.

Due to the way information is obtained in the monopulse technique, increased accuracy over the conical scan tracking method is realized. Also, with the monopulse technique, the speed of detection is increased over that in the conical scan; the integration time (for the monopulse technique) is less than in the conical scan method. This results in more information being obtained in a given time, e.g., the monopulse technique supplies complete azimuth and elevation track information with one signal return, whereas, the conical scan method requires the integration of a number of received pulses in order to obtain complete azimuth and elevation information on a target being tracked. Because the monopulse antenna does not spin, there is less noise caused by antenna motion. Thus, it is possible to mount the monopulse antenna on a gun-turret. In such an installation parallax errors will be eliminated. This is not presently realizable with the conical scan antenna. In addition, the monopulse track system provides more accurate information than the conical scan track system.

Methods employing radar which are presently used to track targets and supply command guidance to a missile directed to destroy the target comprise one of the following configurations:

(1) Installing a beacon in the missile, using an additional separate receiver in the radar and using the radar set to track both the target and the missile;

(2) Using two radar sets—one tracking the target and the other tracking the missile. Here a communication link is required to guide the missile;

(3) Using the beam riding technique. In this method, the missile contains a receiver and seeks the center of a radar beam tracking the target.

It will be recognized that the beam riding technique provides a simpler guidance system. Also, missiles may be fired in salvo. Presently, it is not possible to employ the beam riding guidance technique with a single monopulse radar system because no spinning beam is utilized and the monopulse transmitted energy configuration is not such that complete missile guidance commands can be obtained.

From the above discussion it will be clear to one skilled in the art that tracking a target and supplying command guidance to a missile with a single monopulse radar set results in savings in the amount of equipment required. Another advantage of using one monopulse radar for both functions is realized if jamming is encountered and target range information is lost. A monopulse system capable of tracking the target and simultaneously guiding the missile would track the source of jamming and guide the missile along the antenna boresight line to the target.

Accordingly, it is an object of this invention to provide a method for conically scanning a transmitting R-F beam of energy.

Another object is to modify a monopulse track antenna system so that a target may be tracked using monopulse techniques and a conical scan transmitting antenna pattern be obtained simultaneously.

A further object is to provide means for simultaneously permitting a monopulse antenna to scan conically and retain its performance as a monopulse receive antenna.

A still further object is to modify a monopulse track antenna system so that a target may be tracked and guidance information is supplied to a beam riding missile simultaneously.

Another object of this invention is to provide a conical scan using an antenna that has no spinning parts.

Still another object is to obtain a single, constant polarization beam positionable in space by varying the phase between two R-F signals combined to form the beam.

According to one embodiment of this invention two R-F signals having identical polarization and with spacing and directional differences are combined to produce a single, constant polarization, electromagnetic beam which is positionable in space by varying the phase between the two R-F signals.

The features of the invention desired to be protected are set forth in the appended claims. The invention itself, together with further objects and advantages thereof, may best be understood by reference to the following description and the accompanying drawings, wherein:

FIGURE 1 is a block diagram showing the basic elements necessary to produce a conical scan using a non-spinning antenna;

FIGURE 2 is one embodiment illustrating one possible orientation of antenna reflectors that may be employed in obtaining a conical scan using the non-spinning antenna shown in FIGURE 1;

FIGURE 3 is a block diagram of one embodiment of the invention employed with a monopulse antenna system for tracking a target and supplying command guidance to a beam riding missile simultaneously; and FIGURES 4 and 5 are graphical representations of test patterns of radiated beams obtained using the modified monopulse antenna and feed system of FIGURE 3.

A method by which a conical scan is obtained using a stationary antenna is presented in the following discussion in conjunction with FIGURE 1.

A source of R-F energy supplied by any suitable transmitter 46, feeds power $P_t$ through feed 48 to a hybrid device 50, which is a conventional power divider. Power divider 50 supplies energy $P_b$ and $P_a$ to two output feeds, 52 and 54, respectively. Serially connected with one output feed from hybrid device 50, in this instance in series with feed 52, is linear phase shifter 56. Phase shifter 56, is of conventional design and can be either electrical or mechanical. Phase shifter 56 shifts the phase of the signal in the channel in which it is connected linearly from zero to $2n\pi$ radians. The output of phase shifter 56 is fed through feed 53 to a second hybrid device 58 which also accepts the input from feed 54. Outputs from hybrid device 58, $E_1$ and $E_2$, are applied through feeds 60 and 61, respectively, and reflected into space by reflectors 64 and 62, respectively. $E_1$ and $E_2$, and $E_s$ are the voltages in sum arms; $E_d$ is the voltage in the difference arm.

The operation of this invention is presented hereinafter. The following symbols have been designated and defined to facilitate discussion of the operation:

Let $P_t$=total power input to power divider 50.
Let $P_a$=power in the sum channel arm 54.
Let $P_b$=power in the sum channel arm 52.
Let $E_s$=voltage in the sum channel arm 54.
Let $E_d$=voltage in the difference channel arm 53.
Let $K$=magnitude of the ratio of the sum channel voltage to the difference channel voltage.
Let $\phi$=angle by which the difference channel voltage lags the sum channel voltage.
Let $u$=reduced angle variable in the amplitude plane.
Let $u_0$=reduced half squint angle in the amplitude plane.
Let $E_1$=collinear arm output voltage.
Let $E_2$=collinear arm output voltage.
Let $v$=reduced angle variable in the phase plane.
Let $\delta$=total phase difference between antennas.
Let $E_\delta$=sum pattern voltage in phase plane.
Let $P_s$=power in the sum arm of hybrid device 58.
Let $P_d$=power in the difference arm of hybrid device 58.

Assuming hybrid device 50 is designed with the required matching characteristics, the following equation describes the power distribution:

$$P_t = P_a + P_b = P_s + P_d \quad (1)$$

Voltages associated with hybrid device 58 are $E_s$, $E_d$, $E_1$ and $E_2$ as shown. Feeds containing $E_1$ and $E_2$ are the collinear arms, the feed associated with $E_s$ is the E-plane or sum arm, and the feed associated with $E_d$ is the H-plane or difference arm. Expressed as equations, these voltages have the following relationships:

$$E_s = \frac{E_1}{\sqrt{2}} + \frac{E_2}{\sqrt{2}} \quad (2)$$

$$E_d = \frac{E_1}{\sqrt{2}} - \frac{E_2}{\sqrt{2}} \quad (3)$$

The relationship between $E_s$, $E_d$ and $K$ can readily be seen as being:

$$K = \left|\frac{E_s}{E_d}\right| \quad (4)$$

where K is an expression of the voltage division in feeds 53 and 54 as determined by the setting of power divider 50.

Assuming unit input voltage:

$$P_s = K^2 P_d \quad (5)$$

Solving Equations 1 and 5 for $P_s$ and $P_d$:

$$P_s = \frac{K^2}{1+K^2} \quad (6)$$

$$P_d = \frac{1}{1+K^2} \quad (7)$$

or $$E_s = \frac{K}{\sqrt{1+K^2}} \quad (8)$$

$$E_d = \frac{1}{\sqrt{1+K^2}} \quad (9)$$

Assuming that the phase shift caused by linear phase shifter 56 causes $E_d$ to lag $E_s$ by an angle $\phi$, then by substituting Equations 8 and 9 into Equations 2 and 3 there results:

$$E_1 = \sqrt{\frac{K^2 + 2K\cos\phi + 1}{2(1+K^2)}} \; \bigg/ \tan^{-1}\frac{-\sin\phi}{K+\cos\phi} \quad (10)$$

and $$E_2 = \sqrt{\frac{K^2 - 2K\cos\phi + 1}{2(1+K^2)}} \; \bigg/ \tan^{-1}\frac{\sin\phi}{K-\cos\phi} \quad (11)$$

Equations 10 and 11 reveal that both the magnitude and the phase relationship in the two transmitted voltages $E_1$ and $E_2$ depend on both $\phi$ and K. For any particular value of K, the voltages $E_1$ and $E_2$ may be analyzed for various values of $\phi$.

Reference will now be made to FIGURE 2, which is one embodiment illustrating the orientation of antenna reflectors of paraboloid configuration used to obtain a conical scan.

The reflectors of this antenna are oriented as are the reflectors in the combination amplitude-phase comparison monopulse antenna which is described completely in co-pending application Serial No. 238,071, filed July 23, 1951, now Patent No. 3,040,310, entitled "Radar Tracking and Antenna System" in the name of Walter Hausz and assigned to the same assignee.

For purposes of this discussion, assume that $E_1$ is being reflected from A and $E_2$ is being reflected from B. For a given value of K, it can be seen from Equations 10 and 11 that at $\phi=0$, there is no phase difference between $E_1$ and $E_2$. However, $E_1$ is a maximum and $E_2$ is a minimum, and the resultant beam radiating from the antenna points downward. At $\phi=\pi/2$ radians, $E_1=E_2$ but at maximum phase difference and $E_2$ is leading $E_1$. The resultant antenna beam is then radiated to the left. At $\phi=\pi$, the beam points upward. At $\phi=3\pi/2$, the beam points to the right. At $\phi=2\pi$, conditions are the same as at $\phi=0$. Thus, as the phase between $E_s$ and $E_d$ is varied linearly from 0 to $2n\pi$ radians, the resultant transmitted beam formed by combining $E_1$ and $E_2$ is a conical (elliptical) scan traversing $2n\pi$ radians.

Elevation position of the resultant beam at any value of phase shift is related to the relative magnitudes of $E_1$ and $E_2$. The azimuth position of the resultant beam at any phase shift is related to the phase difference between $E_1$ and $E_2$. The combination of amplitude difference and phase difference between $E_1$ and $E_2$ determines completely the position of the resultant beam.

Applying recognized, state-of-the-art antenna theory, (see S. Silver, Microwave Antenna Theory and Design, McGraw-Hill Book Company, Inc., New York, 1949, p. 180), the following expressions are derived for the amplitude comparison or elevation plane pattern:

$$E_1 = \sqrt{\frac{K^2 + 2K\cos\phi + 1}{2(1+K^2)}} \cdot \frac{\sin(u-u_0)}{u-u_0} \; \bigg/ \tan^{-1}\frac{-\sin\phi}{K+\cos\phi} \quad (12)$$

$$E_2 = \sqrt{\frac{K^2 - 2K\cos\phi + 1}{2(1+K^2)}} \cdot \frac{\sin(u+u_0)}{u+u_0} \; \bigg/ \tan^{-1}\frac{\sin\phi}{K-\cos\phi} \quad (13)$$

Also, by applying recognized, state-of-the-art antenna theory (see J. Kraus, Antennas, McGraw-Hill Book Company, Inc., pgs. 64 and 65, New York, 1950), the following expression can be derived for the phase or the azimuth plane pattern:

$$E_\phi = 2\left[0.707 \frac{\sin\sqrt{v^2+u_0^2}}{\sqrt{v^2+u_0^2}}\right]\cos\frac{\delta}{2} \qquad (14)$$

In FIGURE 3, there is shown one embodiment of the invention in combination with a monopulse amplitude-phase track radar antenna such that command guidance may be supplied to a beam riding missile with the present technique while maintaining the tracking feature of the monopulse system.

A source of R-F energy 46, which may be a suitable transmitter such as a monopulse transmitter, supplies power through feed 48 to hybrid device 50. Said device may be of conventional design, such as a magic tee, and functions as a variable power divider. Power divider 50 supplies power through two output feeds 52 and 54, which are referred to as sum arms. An impedance matching termination 44 is also connected to the difference arm 49 of hybrid device 50 to minimize power losses. Serially connected with sum arm 54 is a conventional transmit-receive (T-R) device 57.

A conventional linear phase shifter 56 and a transmit-receive device 57 are serially coupled with the difference arm 53 and inserted between hybrid devices 50 and 58. It will be recognized by those skilled in the art that feeds 48, 49, 52, 53 and 54 are conventional wave guides commonly used for transmitting R-F energy from one point to another.

In the transmit condition, transmit-receive devices 57 allow the R-F energy to be fed to hybrid device 58, which is also a magic-tee. The outputs from hybrid device 58 are coupled through feeds 60 and 61 and reflected into space by reflectors 64 and 62, respectively. In the receive condition, transmit-receive devices 57 couple the return energy reflected from the target through feeds 68 to the monopulse receiver (not shown) and do not permit any returned energy to be fed to hybrid device 50.

It can readily be seen that this system in the transmit condition is the basic configuration of FIGURES 1 and 2 used with a monopulse radar. The monopulse radar receiver is operable when in receive condition.

Operation of the embodiment of FIGURE 3 bears out the accuracy of the mathematical analysis presented hereinbefore. The introduction of a linear continuously variable phase shifter in either arms 52 or 54 of a monopulse antenna system produces a tilted beam which rotates about the received boresight line of the antenna at a rate determined by the rate at which the phase is shifted. During the monopulse receive function, the system operates as a normal monopulse track system on receive. Representative beam trace antenna patterns obtained for various values of K, where the phase between the signals in the sum and difference arms was varied linearly between 0 and $2\pi$ radians, are shown in FIGURES 4 and 5. FIGURE 4 illustrates the scan obtained for $K=1.25$; FIGURE 5 illustrates the scan for $K=0.80$. Both traces are elliptical and describe a 360° path as the phase shift between the R-F signals in the sum and difference arms are varied 360°.

While particular embodiments of the invention have been shown and described herein, it is not intended that the invention be limited to such disclosures, but that changes and modifications can be made and incorporated within the scope of the claims.

What is claimed is:

1. A method for transmitting a radio frequency beam of energy of the combination amplitude-phase comparison type which is positionable in space from a fixed or non-spinning antenna system comprising the steps of dividing a source of radio frequency energy into two radio frequency signals of constant polarization and of a selected power ratio, continuously varying the phase of one of said two radio frequency signals linearly, combining said signal of constant polarization with said signal having a variable phase difference to provide a single pair of signals which vary in relative phase and amplitude, and radiating said combined signals from spaced sources having divergent orientations to form a conically scanning electromagnetic beam, the rate of rotation of said beam being determined by the rate at which the phase between said signals is varied.

2. In a radar system including means for developing a source of radio frequency energy and stationary or non-spinning antenna means for radiating a radio frequency beam of energy, said antenna means comprising a pair of parabolic reflectors in tiled relationship to each other, means for modifying said radio frequency energy whereby there is radiated an electromagnetic beam of energy that is positionable in space, comprising hybrid means for producing two radio frequency signals having identical polarization from said source of radio frequency energy, linear phase shifting means for varying the phase of one of said two polarized radio frequency signals, a second hybrid means for combining the polarized radio frequency signal and said other radio frequency signal which was varied in phase, and means including said antenna means to radiate said combined signals to produce a constant polarized signal.

3. Apparatus for transmitting a radio frequency beam of energy which is positionable in space from a fixed or non-spinning antenna system comprising means for providing a source of radio frequency energy, hybrid means for dividing said radio frequency energy into two identical radio frequency signals, linear phase shifting means for varying the phase of one of said two radio frequency signals, single hybrid means for combining said two radio frequency signals for combination amplitude-phase comparison type monopulse operation, and a single pair of antenna elements for radiating said combined signals into space as a conically scanning beam, the rate of rotation of said beam being determined by the rate at which the phase between said signals is varied.

4. The invention as defined in claim 3 wherein said linear phase shifting means continuously changes the phase of one of said R-F signals through $2\pi n$ radians.

5. A conical scanning, combination amplitude-phase comparison, monopulse radar system comprising:
  (a) a single pair of monopulse radar antenna elements, said elements being spaced so as to scan in a first angular coordinate by phase comparison and being relatively tilted so as to scan in a second angular coordinate by amplitude comparison;
  (b) first and second transmission feed lines;
  (c) a single four port coupling device for coupling signals in said first feed line to said antenna elements in phase and for coupling signals in said second feed line to said antenna elements in phase opposition;
  (d) a source of radio frequency signals for radar transmission;
  (e) a power divider for coupling said radio frequency signal to said first and second feed lines; and
  (f) linear phase shifting means in said second feed line for varying the phase of said radio frequency signal.

6. A conical scanning phase-amplitude monopulse radar system comprising:
  (a) a single pair of monopulse radar antenna elements, said elements being spaced so as to scan in a first angular coordinate by phase comparison and being relatively tilted so as to scan in a second angular coordinate by amplitude comparison;
  (b) first and second transmission feed lines;
  (c) a single four port coupling device for coupling signals in said first feed line to said antenna elements in phase and for coupling signals in said second feed line to said antenna elements in phase opposition;
  (d) a source of radio frequency signals for radar transmission;

(e) phase shifting means in said second feed line for varying the phase of said radio frequency signal; and (f) a power divider for coupling said radio frequency signals to said first and second feed lines, said divider being adjusted so that said signals are unequally divided between said feed lines.

7. A conically scanning combination phase-amplitude comparison monopulse radar system comprising:
   (a) a single pair of monopulse radar parabolic reflector antenna elements, said elements being spaced so as to scan in a first angular coordinate by phase comparison and being relatively tilted so as to scan in a second angular coordinate by amplitude comparison;
   (b) first and second transmission feed lines;
   (c) a single magic tee for coupling signals in said first feed line to said antenna elements in phase and for coupling signals in said second feed line to said antenna elements in phase opposition;
   (d) a source of radio frequency signals;
   (e) a power divider for coupling said radio frequency signal to said first and second feed lines in accordance with the squint angle of said antenna elements; and
   (f) linear phase shifting means in said second feed line for varying the phase of said radio frequency signal.

8. A conical scanning combination amplitude-phase comparison monopulse radar system comprising:
   (a) a pair of relatively tilted amplitude-phase comparison type radar antenna elements;
   (b) a four port coupling means for feeding said antenna elements with signals having respective voltages $E_1$ and $E_2$ defined by $$E_1 = \sqrt{\frac{K^2 + 2K \cos \phi + 1}{2(1+K^2)}}$$

and $$E_2 = \sqrt{\frac{K^2 - 2K \cos \phi + 1}{2(1+K^2)}}$$

wherein K is a constant of the equipment and $\phi$ is a variable phase shift;
   (c) a power divider for coupling a source of R-F transmission signals to two ports of said four port coupling means, said power divider dividing said R-F signal in accordance with said constant K;
   (d) phase shifting means connected between said power divider and the difference port of said coupling means for providing said variable phase shift $\phi$; and
   (e) said coupling means, said power divider, and said phase shifting means being interrelated so that the amplitude and phase of $E_1$ and $E_2$ vary to produce conical scanning.

References Cited by the Examiner

UNITED STATES PATENTS

| | | | |
|---|---|---|---|
| 2,041,600 | 5/36 | Friis | 343—100.6 |
| 2,619,635 | 11/52 | Chait | 343—100.3 |
| 2,711,508 | 6/55 | Stirrat | 250—27 X |
| 2,951,996 | 9/60 | Pan | 333—11 |
| 3,032,759 | 5/62 | Ashby | 343—16 |

CHESTER L. JUSTUS, *Primary Examiner.*